(12) United States Patent
Cazalet (10) Patent No.: US 9,703,119 B2
(45) Date of Patent: Jul. 11, 2017

(54) COMPACT FOLDING ARCHITECTURE FOR HEAD MOUNTED DEVICE

(71) Applicant: Google Inc., Mountain View, CA (US)

(72) Inventor: Peter Michael Cazalet, Campbell, CA (US)

(73) Assignee: Google Inc., Mountain View, CA (US)

( * ) Notice: Subject to any disclaimer, the term of this patent is extended or adjusted under 35 U.S.C. 154(b) by 336 days.

(21) Appl. No.: 14/459,122

(22) Filed: Aug. 13, 2014

(65) Prior Publication Data

US 2016/0048036 A1    Feb. 18, 2016

(51) Int. Cl.

| G06F 1/16 | (2006.01) |
|---|---|
| H05K 5/00 | (2006.01) |
| H05K 7/00 | (2006.01) |
| G02C 5/22 | (2006.01) |
| G02B 27/01 | (2006.01) |

(52) U.S. Cl.
CPC ......... *G02C 5/2236* (2013.01); *G02B 27/017* (2013.01); *G02C 5/2227* (2013.01); *G02B 2027/0178* (2013.01); *G02C 2200/28* (2013.01)

(58) Field of Classification Search
CPC ............................... G06F 1/16; G02C 5/2236
USPC ........................ 361/679.01, 679.03
See application file for complete search history.

(56) References Cited

U.S. PATENT DOCUMENTS

| 3,923,384 | A | | 12/1975 | Leblanc | |
|---|---|---|---|---|---|
| D327,079 | S | * | 6/1992 | Allen | ........................... D16/309 |
| 5,991,085 | A | * | 11/1999 | Rallison | ............... G02B 27/017 345/8 |
| 6,988,798 | B1 | | 1/2006 | Duffie | |
| 8,743,463 | B2 | | 6/2014 | Fujishiro | |
| 8,971,023 | B2 | * | 3/2015 | Olsson | ..................... G02C 5/12 345/8 |
| 9,027,205 | B2 | * | 5/2015 | Ahn | ....................... G06F 1/1681 16/354 |
| 9,115,750 | B2 | * | 8/2015 | Park | |
| 2005/0248852 | A1 | | 11/2005 | Yamasaki | |
| 2007/0161292 | A1 | | 7/2007 | Igarashi | |

(Continued)

FOREIGN PATENT DOCUMENTS

| KR | 2006-0071824 A | 6/2006 |
|---|---|---|
| KR | 2011-0131884 A | 12/2011 |

OTHER PUBLICATIONS

International Search Report and Written Opinion for PCT Application No. PCT/US2015/044901, dated Nov. 18, 2015.

*Primary Examiner* — Anthony Haughton
(74) *Attorney, Agent, or Firm* — Lerner, David, Littenberg, Krumholz & Mentlik, LLP (57) ABSTRACT

An example of a hinge mechanism for a head mounted device is provided. Aspects of the disclosure relate generally to folding the head mounted device in a secure fashion for convenient storage and transportation. The head mounted device may have an asymmetrical shape with an enlarged and elongated first side arm. In this regard, the hinge mechanism allows the head mounted device to fold at an angle so as not to interfere with a second side arm of the head mounted device. The head mounted device may also implement a flexguard component configured to bend along with the hinge structure so as to protect internal components that become exposed due to the folding of the hinge. An axial cam system is also implemented to allow for the secure and comfortable folding and opening of the head mounted device.

20 Claims, 8 Drawing Sheets

(56) References Cited

U.S. PATENT DOCUMENTS

| | | | |
|---|---|---|---|
| 2012/0200477 A1 | 8/2012 | Fujishiro | |
| 2013/0014346 A1* | 1/2013 | Ahn | G06F 1/1681 16/354 |
| 2013/0169513 A1 | 7/2013 | Heinrich et al. | |
| 2013/0322004 A1* | 12/2013 | Park | F16C 11/10 361/679.27 |

* cited by examiner

COMPACT FOLDING ARCHITECTURE FOR HEAD MOUNTED DEVICE

BACKGROUND

As wearable electronic devices become more popular, these devices should continue to become more convenient to users. For example, certain devices such as head mounted devices and headphones may be bulky and not convenient to transport or store. This may limit the use or appeal of such devices.

SUMMARY

An asymmetrical head mounted device with two hinge structures is provided to more efficiently and conveniently store and transport the device. The hinge structures allows for the convenient closing of the head mounted device, which has one elongated and enlarged side arm. In addition, a flexguard component is implemented to protect a flexible printed circuit board when the head mounted device is in a closed position. An axial cam mechanism is also implemented which secures the hinge structure in either an opened or a closed position, and also comfortably aids the user in opening or closing the hinge.

An apparatus and head mounted device is provided for by the disclosure. In accordance with one embodiment, the apparatus includes a central portion having a first end and a second end and a lateral axis extending between the first and second ends; a first side arm coupled to the first end of the central portion and including a housing; a second side arm coupled to the second end of the central portion; wherein the first side arm is elongated and enlarged with respect to the second side arm; and a first hinge positioned between the first side arm and the first end of the central portion, the first hinge providing for movement of the first side arm between at least a first position and a second position, wherein when the first side arm is in the second position, a first axis of the first side arm forms an angle with the lateral axis of the central portion.

In another example, the second position the first side arm forms the angle below the central portion. According to another example, a second hinge is positioned on the second side arm, and the second hinge provides movement of the second side arm between at least a third position and a fourth position, wherein when the second side arm is in the fourth position, a second axis of the second side arm remains generally parallel to the lateral axis of the central portion. In another example, the apparatus further includes an elbow portion, the elbow portion positioned adjacent to a first end of the first side arm, the first end of the first side arm being adjacent to the first hinge; and a flexguard component positioned within the first hinge and extending into the elbow portion. In that example, the flexguard component is positioned over at least one internal component of the elbow portion. As another example, the at least one internal component of the elbow portion includes at least a flexible printed circuit board. In a further example, the flexible printed circuit board contains a service loop. In another example, the flexguard is configured to flexibly bend around the first hinge when the first hinge is in the closed position. According to another example, a shape of the flexguard component corresponds to a shape of the internal component that the flexguard component is protecting.

According to another example, the apparatus further includes a housing, the housing positioned adjacent to the first hinge, wherein the housing includes an axial cam system. In that example, the axial cam system includes a fixed cam having a first bore; a moving cam having a second bore; and a spring positioned within the first and second bores of the fixed cam and the moving cam. In a further example, the fixed cam includes a plurality of indents; the moving cam includes a plurality of protrusions; and the protrusions of the moving cam align with the indents of the fixed cam. In another example, the moving cam includes a plurality of indents; the fixed cam includes a plurality of protrusions; and the protrusions of the fixed cam align with the indents of the moving cam. In another example, when the first side arm moves beyond a certain point from the first position to the second position, pressure exerted by the spring against the moving and fixed cams causes the first hinge to fully close.

According to another embodiment, a head mounted device includes a hinge providing for movement of a first side arm between at least an opened position and a closed position, the hinge including an extendable service loop of a flexible printed circuit ("FPC") board, the extendable service loop configured to extend when the hinge is moved toward the closed position; and a flexguard positioned at least partially over the FPC board when the service loop is extended. In another example, a shape of the flexguard corresponds to a shape of the FPC board. As another example, the extended service loop contracts when the hinge is moved toward the opened position.

As another embodiment, a head mounted device includes a hinge providing for movement of a first side arm between at least an opened position and a closed position, the hinge including an axial cam system, the axial cam system comprising: a fixed cam having a first bore; a moving cam having a second bore; and a spring positioned within the first and second bores of the fixed cam and the moving cam, wherein the spring is deformable between a compressed position and an uncompressed position, and wherein when the spring is in the compressed position it exerts pressure against the moving and fixed cams. As another example, when the first side arm moves beyond a certain point from the opened position to the closed position, pressure exerted by the spring against the moving and fixed cams causes the first hinge to fully close. In another example, when the first side arm moves beyond a certain point from the closed position to the opened position, pressure exerted by the spring against the moving and fixed cams causes the first hinge to fully open.

DETAILED DESCRIPTION

The technology relates generally to a hinge structure of a head mounted device. The hinge structure enables first and second side arms of the head mounted device to fold in a compact manner so that the folded device is more convenient for transport and storage.

In one example, the first and second side arms of the head mounted device form an asymmetrically shaped structure. For instance, the first side arm may be enlarged with respect to the second side arm in order for the first side arm to house the electrical circuitry, battery, processors, etc. used to operate the device. Due to the asymmetric shape of the head mounted device and the enlarged portions of the first side arm relative to the second side arm, the enlarged first side arm extends beyond the second side arm when folded.

Also, as there may be electrical circuitry contained in a first hinge of the first side arm, a flexguard is utilized in the first hinge to protect the internal components thereof, such as a flexible printed circuit ("FPC") board, when the device is folded. By utilizing the FPC and protecting it with the flexguard, there is sufficient real estate available within the hinge to incorporate additional features, such as an axial cam system. The axial cam system allows for the implementation of a spring and cam system inside the hinge to bias the folded device into the open or folded positions. For instance, the cam system may apply pressure to the hinge when the hinge is opened or closed so that the hinge does not swing opened or closed without user action. This cam system may also force the device into a fully opened or closed position once the user attempts to open or close the first hinge beyond a certain point, such as a half-way point.

The first side arm wraps around a first side of the user's head and hangs over a first ear of the user as the user wears the head mounted device. The second side arm wraps around a second side of the user's head and hangs over a second ear of the user. The second side arm may be an elongated band comprised of a metal or plastic material. In some examples, the second side arm may be included in a pair of prescription glasses, reading glasses, sunglasses, etc. which can detachably engage to the first hinge of the first side arm. These types of glasses can be worn and used by the user while wearing the head mounted device.

When folded at the first hinge, the first side arm folds over at a slightly downward position relative to a lateral axis of the head mounted device. For example, in the closed position, an axis of the first side arm may lie at approximately a 15 degree angle with respect to the lateral axis of the head-mounted device, thereby avoiding the hinge of the second side arm. Thus, the first side arm is able to be tucked away with only a portion of the enlarged first end extending beyond a second hinge of the second side arm. In addition, the second side arm may fold over such that an axis of the second side arm is approximately parallel to the lateral axis of the head-mounted device. As such, a first end of the second side arm that is located opposite the second hinge may rest adjacent to the first hinge of the first side arm.

When the first side arm folds over at the first hinge, the FPC board becomes partially exposed. The FPC board may have been implemented as a replacement for typical wiring. In this regard, a flexguard component is implemented on the hinge structure, which is configured to flexibly bend around the first hinge, thereby covering the exposed portion of the FPC board. The flexguard may be a piece of material, such as metal, that correlates to a shape of the FPC board. The shape may be, for example, rectangular. When the first hinge is in the closed position the flexguard folds over along with the FPC board on an optics pod of the first hinge, thereby providing protection to the exposed portions of the FPC board. For example, when the head mounted device is opened, the housing of the first side arm and the closed hinge structure is able to house and protect the FPC board, but when the hinge closes the FPC board becomes exposed. The FPC board is routed on a first side of the first hinge adjacent the first side arm, and a second side of the first hinge adjacent the optics pod that may house electrical components and secures a display element in place.

In addition, the FPC board includes a service loop to allow the FPC board to adjust to the opened and closed positions of the hinge. The FPC board may be positioned along the first side arm, over the hinge and onto an optics pod. The service loop of the FPC board may be positioned on the optics pod. In this regard, the service loop may be an extension of the FPC board that wraps around behind the FPC board. This additional FPC board from the service loop may be used when additional FPC board is required. For instance, when the hinge is in the opened position then the additional FPC board from the service loop may remain tucked away behind the FPC board, but when the FPC board is in the closed position, the additional FPC board from the service loop may wrap around the closed hinge structure. In this regard, the service loop extends the length of the FPC board in order to compensate for the closed hinge. In addition, when the service loop extends because the hinge is closed, additional portions of the FPC board become exposed, which may be protected by the flexguard. Such protection prevents the FPC board from being exposed and thereby prevents outside interference and damage to the FPC board, such as via electrostatic discharge or mechanical damage.

Due to the successful implementation of the FPC board and flexguard without the need of electrical wiring, additional real estate inside the hinge is available for other components and features. For example, an axial cam system may be implemented to allow for a tight and secure opened or closed hinge state. The cam system may work by using a spring inserted in the center of a bore on two cams, a top cam and a bottom cam, each cam having a shape of an ebb and flow pattern thereon. For instance, the ebb and flow pattern may be considered indents and protrusions on the cams. The spring causes the top cam to rotate, but the bottom cam remains in a fixed state. Thus, when the device is in the open position and the user attempts to close the first hinge, the spring drives pressure into the top cam, causing the top cam to rotate along the bottom cam. In turn, when the user closes the hinge past a certain point, such as 45 degrees, protrusions of the top cam may move into indents of the bottom cam, and protrusions of the bottom cam may similarly move into indents of the top cam. In this regard, the smooth ebb and flow pattern of the cams causes the cams to efficiently mate and fall into place, while securing the head mounted device in the respective position.

Figure 1:
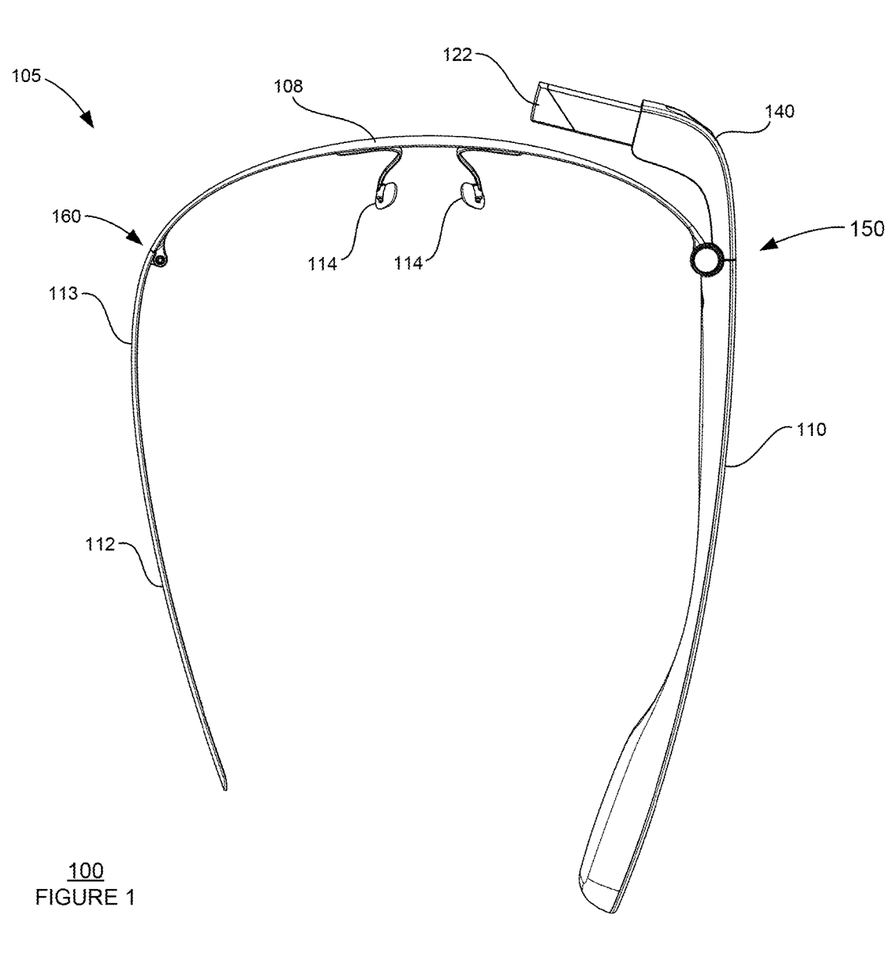
FIG. 1 is a top view of an example wearable device including a first hinge and a second hinge in accordance with aspects of the disclosure.

FIG. 1 illustrates one example of the hinge mechanism on the head mounted device as described above. As shown in example 100 of FIG. 1, the head mounted device 105 forms an asymmetrical shape. The head mounted device 105 contains a central portion 108 that extends in two opposing directions toward a first side arm 110 and a second side arm 112. The central portion also includes nose pieces 114 extending therefrom. The first and second side arms 110 and 112 and the nose pieces 114 are configured to secure the head mounted device 105 to a head of the user, for example, by extending over the first and second ears of the user and resting on a nose of the user.

The head mounted device may be comprised of a solid structure such as plastic, metal, etc., and also combinations thereof. Other materials and configurations are also possible.

The first side arm 110 of the head mounted device 105 includes outer housing 120 to protect internal components therein. The outer housing 120 may include, for example, electrical circuitry, wiring, processors, etc. which may be used to operate the device. The first side arm may be larger and elongated as compared to the second side arm so as to accommodate the components contained in the first side arm, thus resulting in the asymmetric shape of the overall architecture of the head mounted device.

Display 122 may be formed of any material that can suitably display a projected image or graphic. The display 122 may also be sufficiently transparent so as to allow the user to see through the display. In addition, the internal components of the first side arm may be operatively coupled to display 122. Additional components to operate the device may be housed in an elbow portion 140, which is coupled to display 122 and secures the display in place, as shown in FIG. 1. The internal components of the first side arm and the elbow portion may operate the head mounted device; thus causing an image, graphic, menu options and other forms of text, etc. to show on display 122.

Figure 2:
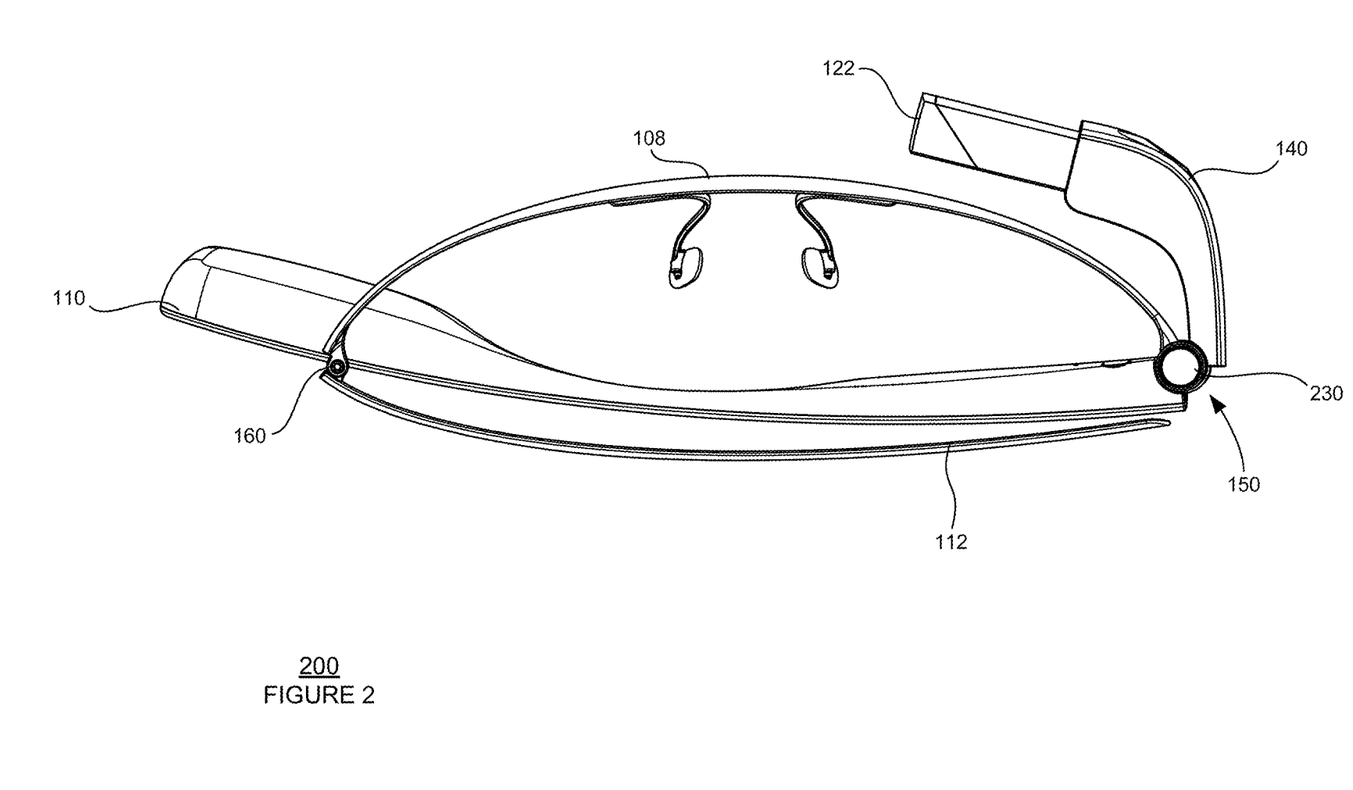
FIG. 2 a top view of the wearable device in a closed position in accordance with aspects of the disclosure.

Head mounted device 105 includes two hinge mechanisms that allow a user to fold the device for easier storage and transportation. A first hinge 150 is located on the first side arm 110 and a second hinge 160 is located on the second side arm 112. The first and second hinges 150 and 160 allow for the user to easily open and close the head mounted device. The first hinge 150 of the first side arm 110 is positioned on a first end of the first side arm 110 that is adjacent to the central portion 108. As illustrated in FIG. 2, the first hinge 150 is positioned where a button 230, central portion 108, first side arm 110, and the elbow portion 140 come together. Alternative locations of the hinge are also possible. For example, the hinge may be placed by itself on the first side arm, without being directly adjacent to the button 230, elbow portion 140, etc. The second hinge 160 on the second side arm 112 is also positioned on a first end 113 of the second side arm that is adjacent to the central portion 108, as illustrated in example 100 of FIG. 1.

Example 200 of FIG. 2 is a top view showing the head mounted device folded at both hinges in a closed position. As can be seen, the first side arm 110 is tucked underneath the second side arm 112 and the central portion 108. This accommodates the asymmetric U-shape of the head mounted device 105, and specifically the enlarged and elongated first side arm 110.

Figure 3:
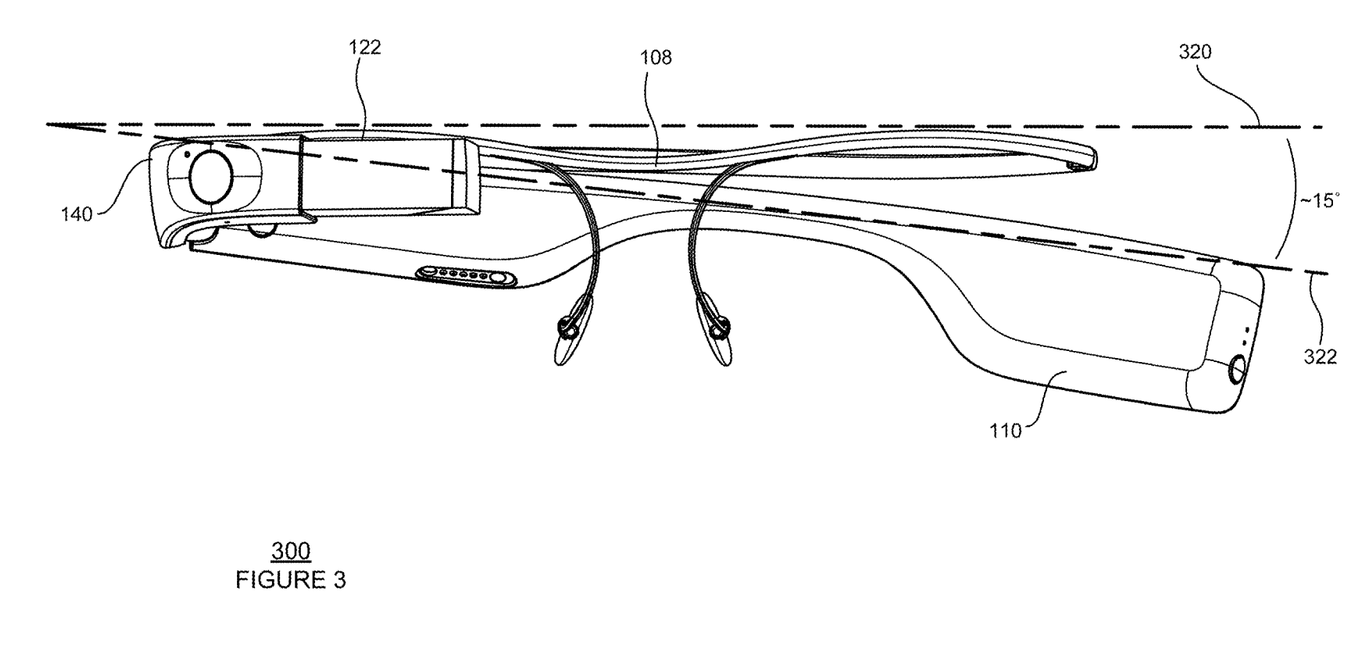
FIG. 3 is a front view of the wearable device in the closed position in accordance with aspects of the disclosure.

Example 300 of FIG. 3 further illustrates the architecture and operability of the first hinge by providing a frontal view of the head mounted device in the closed position. In particular, FIG. 3 shows how the first hinge 150 causes the first side arm to fold at a downward angle in order to maneuver around the second side arm and the central portion of the head mounted device. In this example, an axis 322 of the first side arm folds downward at roughly a 15 degree angle with respect to a lateral axis 320 of the central portion 108. In this regard, the first side arm is neatly tucked away underneath the second side arm and central portion 108. It should be understood that the first side arm may be folded at any of a number of other angles. For example, the first side arm may bend downward at a 5 degree angle, 10 degree angle, 25 degree angle, etc. In addition, the first side arm 110 may not only bend downward, but it may bend upward as well so that the first side arm 110 is positioned above the second side arm. In this regard, the first side arm may bend upward at a 5, 10, 15 or any other degree angle above the second side arm and central portion.

Figure 4:
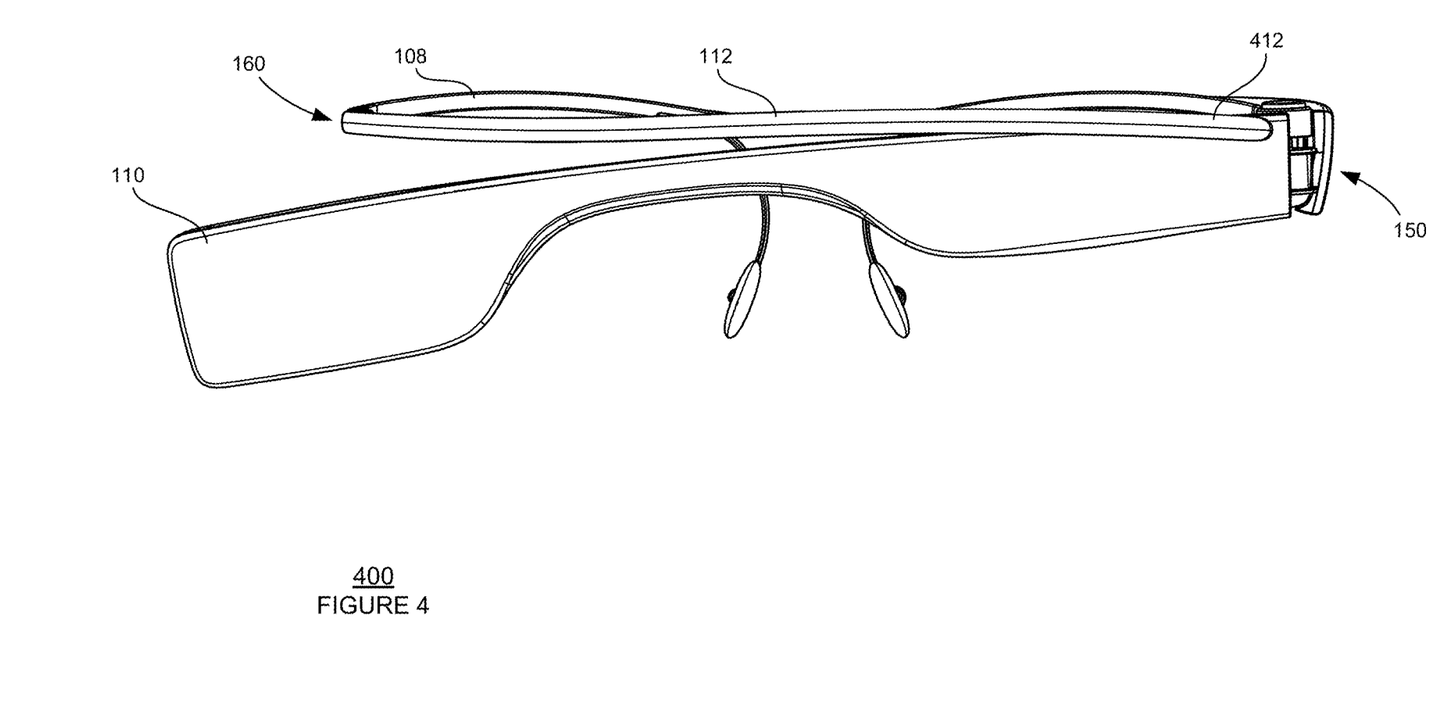
FIG. 4 is a back view of the wearable device in the closed position in accordance with aspects of the disclosure.

As shown in example 400 of FIG. 4, the second side arm 112 folds such that an axis of the second arm 112 remains substantially parallel to the lateral axis of the central portion 108. In this regard, a second end 412 of the second side arm 112 that is opposite the central portion rests adjacent to the first hinge of the first side arm 110 when the second hinge is folded.

Figure 5:
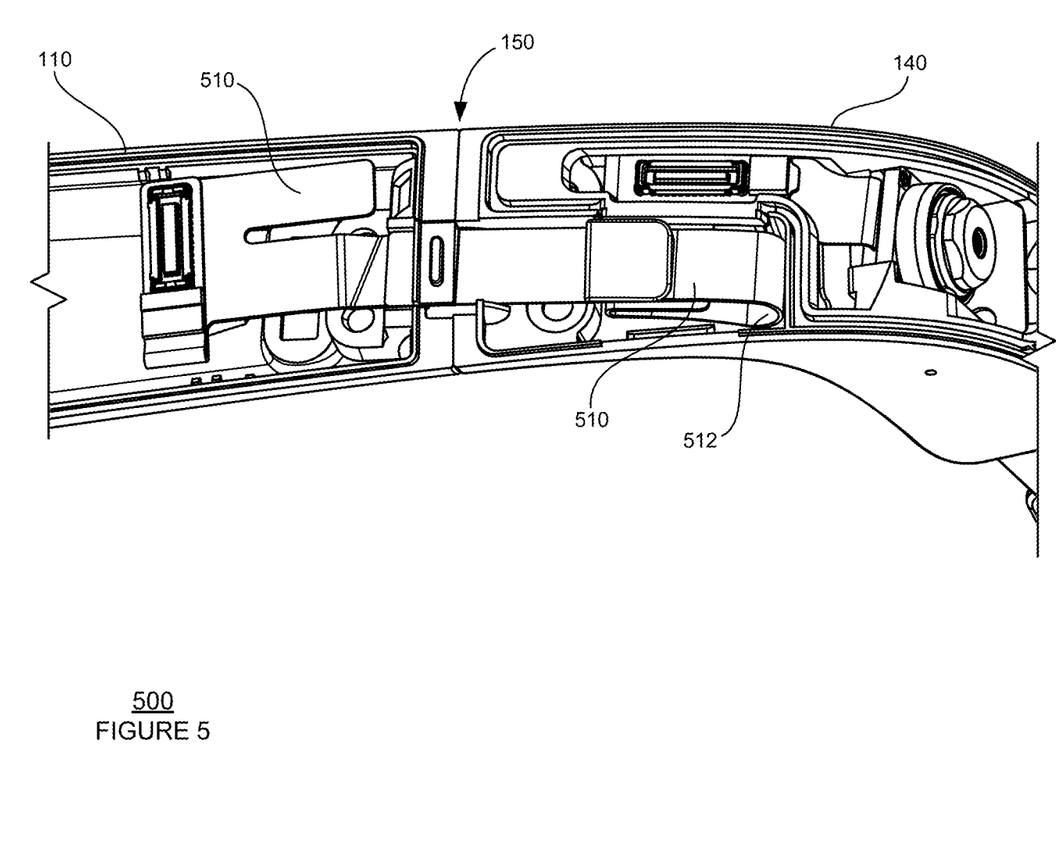
FIG. 5 is a detailed view of a flexguard and Flexible Printed Circuit board of the wearable device in accordance with aspects of the disclosure.

When the head mounted device folds, the internal components of the head mounted device may still be able to operate around the first hinge. In this regard and as shown in example 500 of FIG. 5, an FPC board 510 is implemented to efficiently route signals among the internal components of the first side arm 110, button (not shown), and elbow portion 140. The elbow portion 140 may be an optics pod that houses the electrical circuitry and components to operate the display element (not shown). The FPC board 510 may be located on both sides of the hinge 150. This allows the FPC board 510 to route electrical signals when the head mounted device is in the opened or closed position. In addition, the FPC board 510 contains a service loop 512 which allows additional FPC board to be tucked away in the elbow portion 140. For example, the service loop may be an extension of the FPC board that is able to extend when additional FPC board is required. Accordingly, when the first hinge folds into the closed position, the FPC board 510 is able to extend around the first hinge by using the additional FPC board that is stored as a result of the service loop.

Figure 6:
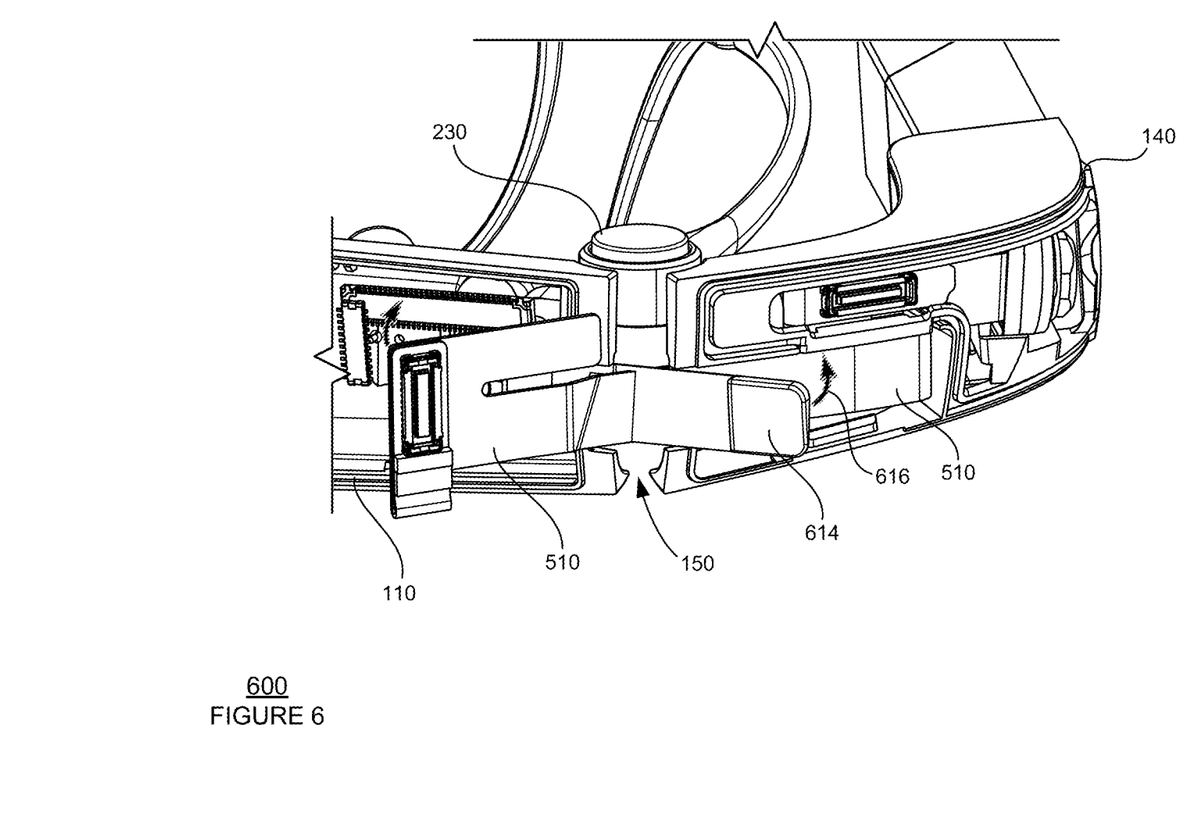
FIG. 6 is another detailed view of the flexguard and Flexible Printed Circuit board of the wearable device in the closed position in accordance with aspects of the disclosure.

When the first hinge 150 is folded into the closed position, a flexguard folds over along with the FPC board for protection. As one example, the FPC board 510 becomes at least partially exposed when the first hinge closes due to the additional FPC board released from the service loop. In this regard and as illustrated in example 600 of FIG. 6, flexguard 614 flexibly folds around button 230 and folds along the elbow portion 140 in order to protect the exposed portion of the FPC board 510. Thus, the flexguard acts a cover to protect internal components of the first side arm, namely the FPC board. It should be understood that the flexguard may be configured to protect other components of the first side arm as well. The flexguard may be attached to the first side arm 110, the button 230, the elbow portion 140, or combinations thereof. As shown by arrow 616, the flexguard 614 folds or bends over and covers the FPC board 510 when the first hinge closes. As can be seen in FIG. 6, if the flexguard was not present then the FPC board would be exposed to potential outside interferences, such as electrostatic discharge. In this regard, the flexguard may be comprised of any protectant type material, such as metal, plastic, etc. In addition, the part of the flexguard that bends may be comprised of any material that can bend along an angle of a hinge, and then bend back into its original position. For example, the bendable material may be comprised of a rubbery material, flexible plastic, or the like.

In some examples, the shape of the flexguard corresponds to the shape of the FPC board in order to sufficiently protect it. For example, as shown in example 600 of FIG. 6, the flexguard is rectangular, which corresponds to the rectangular shape of the FPC board. The flexguard may also be a different shape than the FPC board as long as the size of the flexguard is sufficient to fully protect the exposed portions of the FPC board.

Since the FPC board is implemented and sufficiently protected, space is saved within the button and hinge structure for other components and features. As one example, an axial cam system may be implemented in order to securely operate the hinge mechanism. For instance, the axial cam system causes the hinge to be tightly secured when the head mounted device is either in the opened or closed state; thus stopping the first hinge from flailing. If an FPC board was not implemented then wiring and other electrical components more robust than the FPC board may be used to route electrical signals. In turn, these other components may take up additional space.

Figure 7:
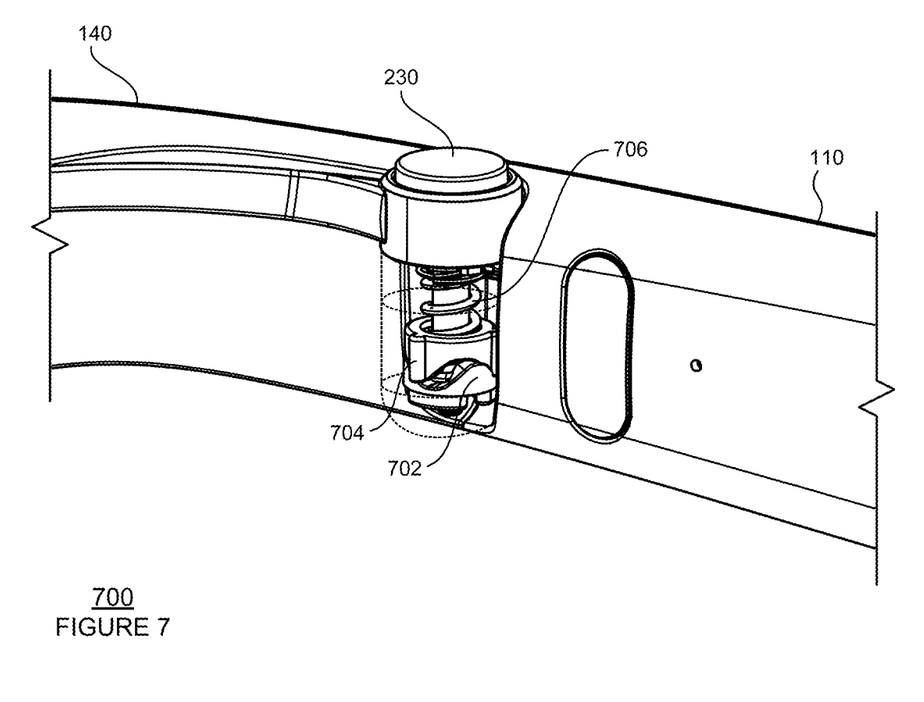
FIG. 7 is a detailed view of an axial cam system of the wearable device in accordance with aspects of the disclosure.

As shown in example 700 of FIG. 7, the axial cam system implements a fixed cam 702, moving cam 704, and a spring 706 for the cam system to operate. In this regard, the spring 706 is positioned within bores of the fixed cam 702 and moving cam 704.

Figure 8:
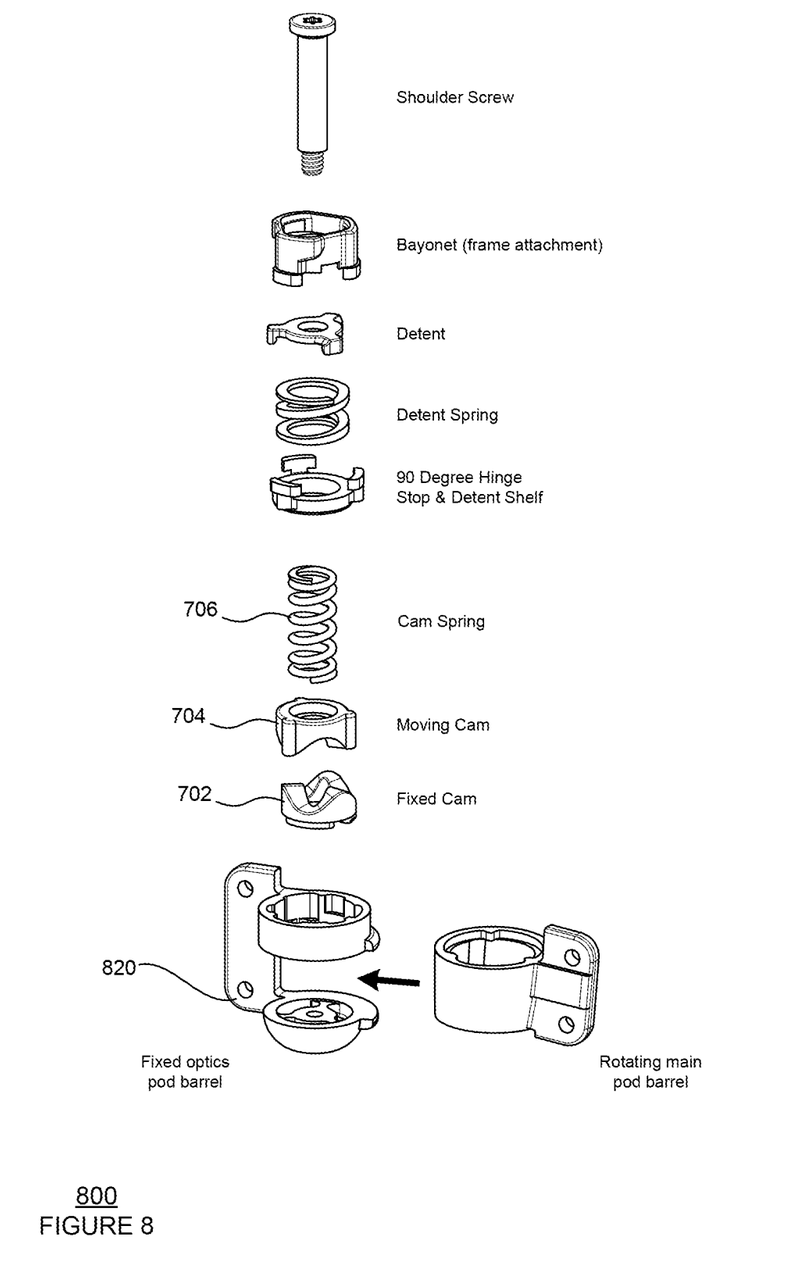
FIG. 8 illustrates an overview of the composition of pieces of the axial cam system in accordance with aspects of the disclosure.

Example 800 of FIG. 8 provides a deconstructed view of the overall configuration of the axial cam system within the first hinge 150. In particular, the fixed cam 702 is positioned within fixed optics pod barrel 820. From there, the spring 706 is inserted in respective bores of the fixed cam 702 and moving cam 704.

As illustrated in FIGS. 7 and 8, the fixed and moving cams 702 and 704 form corresponding ebb and flow shapes so that the two pieces can mate with each other. For instance, the fixed and moving cams 702, 704 contain indents and protrusions. Where there is an indent on the fixed cam, a protrusion on the moving cam corresponds and fits into the indent of the fixed cam. Similarly, where there is an indent on the moving cam, the fixed cam has a corresponding protrusion that mates with and fits into the indent of the moving cam. As depicted in FIG. 8, the fixed and moving cams have three protrusions and three indents. The protrusions may be, for example, 120 degrees apart; however, fewer or additional protrusions and indents may be included, and the distances between protrusions or indents may be varied. For example, there may be four protrusions and indents in the respective cams that are 90 degrees apart. Moreover, a size of the protrusions and/or indents may also be varied. For example, protrusions may be wider, taller, deeper, etc.

The spring 706 may be, for example, a compression spring that applies pressure to the moving cam 704 in order to press the moving cam 704 against the fixed cam 702. For instance, because the spring 706 continuously applies pressure against the cams, the first hinge 150 does not flail with the slightest movement. Rather, pressure from the spring 706 against the cams 702, 704 forces the first hinge to remain sturdy in either the closed position or the opened position.

In addition to the axial cam system securing the head mounted device in the opened or closed state, it also provides a mechanism for the user to easily open and close the device. For example, as discussed above the fixed and moving cams 702 and 704 contain corresponding ebb and flow grooves. In this regard, when the user attempts to, for example, shut the first hinge, moving cam 704 rotates around the spring 706 and fixed cam 702. When a protrusion of the moving cam passes a protrusion of the fixed cam, then the protrusion of the moving cam is able to securely fit and rest into an indent of the fixed cam. In this regard, once the user closes the hinge beyond a certain point, such as at or beyond 45 degrees, then the axial cam system may cause the first hinge to fully close. Specifically, the protrusion on the moving cam 704 may move beyond the protrusion on the fixed cam 702, and then fall into the indented place of the fixed cam. The protrusions of the moving cam 704 may move beyond one, all, or some of the protrusions of the fixed cam 702 before being secured into the indented place of the fixed cam 702. In addition, the spring 706 may continue to apply pressure to the moving cam 704 so that the moving cam securely stays in place, as discussed above.

The subject matter described herein is advantageous in that it provides a convenient system to fold the asymmetric head mounted device, while allowing additional functionalities to be implemented as well. In addition, the hinge structure functions properly even with the enlarged and elongated first side arm, which houses the electrical components that operate the device. In addition, the implementation of the flexguard allows for additional real estate in the hinge structure to be utilized for other features. In this regard, the axial cam system is implemented to secure the head mounted device in its respective opened or closed positions, and also adds convenience in opening and closing the device.

As these and other variations and combinations of the features discussed above can be utilized without departing from the subject matter as defined by the claims, the foregoing description of embodiments should be taken by way of illustration rather than by way of limitations of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. An apparatus comprising:
   a central portion having a first end and a second end and a lateral axis extending between the first and second ends;
   a first side arm coupled to the first end of the central portion and including a housing;
   a second side arm coupled to the second end of the central portion;
   wherein the first side arm is elongated and enlarged with respect to the second side arm;
   a first hinge positioned between the first side arm and the first end of the central portion, the first hinge providing for movement of the first side arm between at least a first position and a second position, wherein when the first side arm is in the second position, a first axis of the first side arm forms an angle with the lateral axis of the central portion;
   an elbow portion positioned adjacent to a first end of the first side arm, the first end of the first side arm being adjacent to the first hinge; and
   a flexguard component positioned within the first hinge and extending into the elbow portion, the flexguard component being positioned over at least one internal component of the elbow portion and configured as a cover for the least one internal component.

2. The apparatus of claim 1, wherein in the second position the first side arm forms the angle below the central portion.

3. The apparatus of claim 1, further comprising a second hinge positioned on the second side arm,
   wherein the second hinge provides movement of the second side arm between at least a third position and a fourth position, wherein when the second side arm is in the fourth position, a second axis of the second side arm remains generally parallel to the lateral axis of the central portion.

4. The apparatus of claim 1, wherein the flexguard component is further configured to cover at least one additional internal components of the first side arm.

5. The apparatus of claim 1, wherein the at least one internal component of the elbow portion includes at least a flexible printed circuit board.

6. The apparatus of claim 5, wherein the flexible printed circuit board contains a service loop.

7. The apparatus of claim 6, wherein the service loop is configured to allow a portion of the flexible printed circuit board to be stored within the elbow portion.

8. The apparatus of claim 1, wherein the flexguard is configured to flexibly bend around the first hinge when the first hinge is in a closed position.

9. The apparatus of claim 1, wherein a shape of the flexguard component corresponds to a shape of the internal component that the flexguard component is protecting.

10. The apparatus of claim 1, further comprising a cam housing, the cam housing positioned adjacent to the first hinge, wherein the cam housing includes an axial cam system.

11. The apparatus of claim 10, wherein the axial cam system comprises:
a fixed cam having a first bore;
a moving cam having a second bore; and
a spring positioned within the first and second bores of the fixed cam and the moving cam.

12. The apparatus of claim 11, wherein:
the fixed cam includes a plurality of indents;
the moving cam includes a plurality of protrusions; and
the protrusions of the moving cam align with the indents of the fixed cam.

13. The apparatus of claim 11, wherein:
the moving cam includes a plurality of indents;
the fixed cam includes a plurality of protrusions; and
the protrusions of the fixed cam align with the indents of the moving cam.

14. The apparatus of claim 12, wherein when the first side arm moves beyond a certain point from the first position to the second position, pressure exerted by the spring against the moving and fixed cams causes the first hinge to fully close.

15. A head mounted device comprising:
a hinge providing for movement of a first side arm between at least an opened position and a closed position, the hinge comprising:
an extendable service loop of a flexible printed circuit ("FPC") board, the extendable service loop configured to extend when the hinge is moved toward the closed position; and
a flexguard positioned within the hinge and extending into an elbow portion positioned adjacent to a first end of the first side arm, the first end of the first side arm being adjacent to the hinge, the flexguard at least partially arranged over the FPC board when the service loop is extended, the flexguard being configured as a cover for at least a portion of the FPC board.

16. The electronic device of claim 15, wherein a shape of the flexguard corresponds to a shape of the FPC board.

17. The electronic device of claim 15, wherein the extended service loop is configured to contract when the hinge is moved toward the opened position.

18. A head mounted device including a first side arm, the head mounted device comprising:
a hinge providing for movement of the first side arm between at least an opened position and a closed position, the hinge comprising:
a flexguard positioned within the hinge and at least partially over an internal component of the first side arm, the flexguard covering at least a portion of the internal component of the first side arm; and
an axial cam system, the axial cam system comprising:
a fixed cam having a first bore;
a moving cam having a second bore; and
a spring positioned within the first and second bores of the fixed cam and the moving cam,
wherein the spring is deformable between a compressed position and an uncompressed position, and wherein when the spring is in the compressed position it exerts pressure against the moving and fixed cams.

19. The head mounted device of claim 18, wherein when the first side arm moves beyond a certain point from the opened position to the closed position, pressure exerted by the spring against the moving and fixed cams causes the first hinge to fully close.

20. The head mounted device of claim 18, wherein when the first side arm moves beyond a certain point from the closed position to the opened position, pressure exerted by the spring against the moving and fixed cams causes the first hinge to fully open.

* * * * *